Dec. 16, 1924.
C. D. STEWART
1,519,172
AUTOMOTIVE BRAKE CONTROL
Filed April 11, 1922
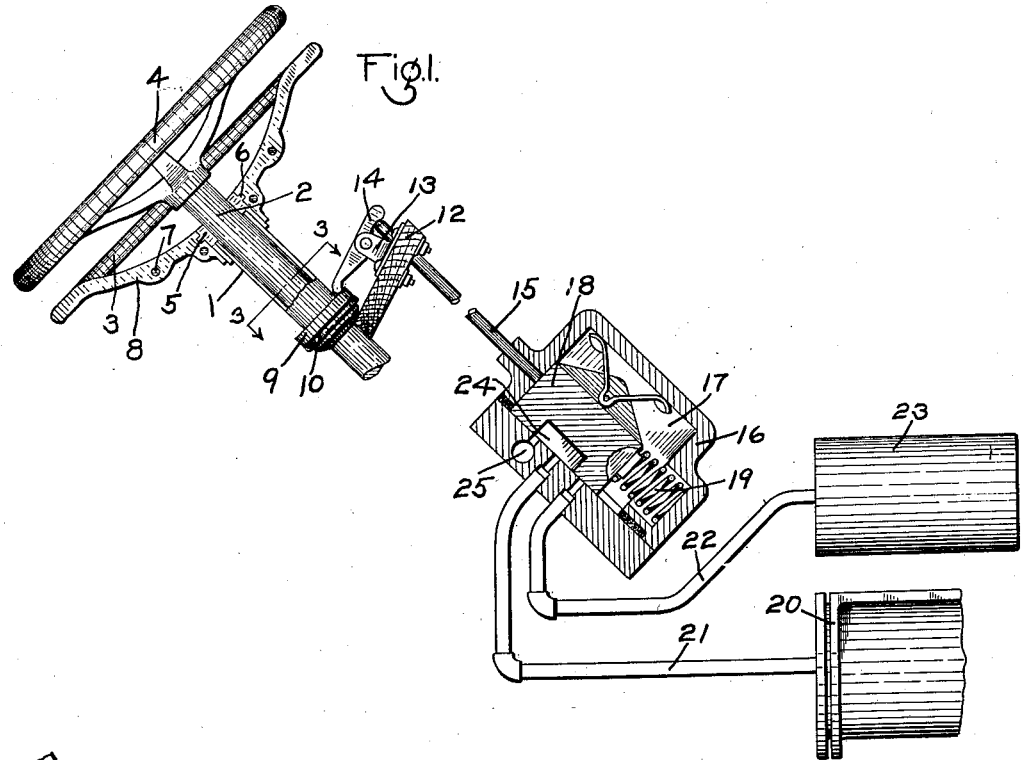
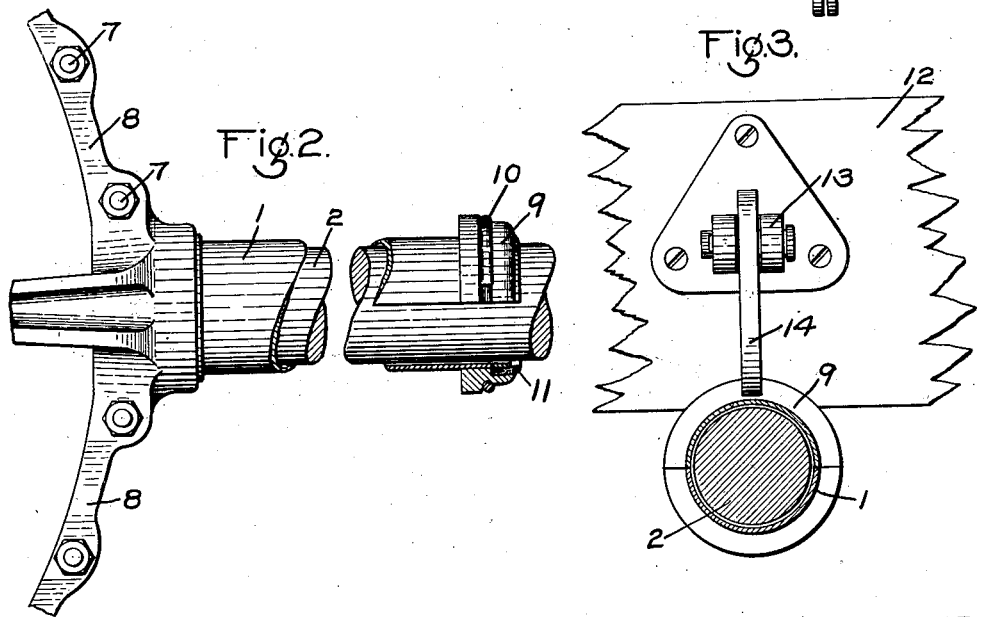
INVENTOR
CARLTON D. STEWART
BY Wm. M. Cady
ATTORNEY Patented Dec. 16, 1924.

1,519,172

UNITED STATES PATENT OFFICE.

CARLTON D. STEWART, OF BERKELEY, CALIFORNIA, ASSIGNOR TO THE WESTING-HOUSE AIR BRAKE COMPANY, OF WILMERDING, PENNSYLVANIA, A CORPORATION OF PENNSYLVANIA.

AUTOMOTIVE BRAKE CONTROL.

Application filed April 11, 1922. Serial No. 551,475.

*To all whom it may concern:*

Be it known that I, CARLTON D. STEWART, a citizen of the United States, residing at Berkeley, in the county of Alameda and State of California, have invented new and useful Improvements in Automotive Brake Controls, of which the following is a specification.

This invention relates to a motor vehicle brake controlling device, and more particularly to a fluid pressure brake controlling device.

The principal object of my invention is to provide an improved motor vehicle brake controlling device of the above character.

In the acompanying drawing; Fig. 1 is a diagrammatic view, partly in section, of a motor vehicle brake controlling device embodying my invention; Fig. 2 an enlarged view of the sliding sleeve member applied to the steering column; and Fig. 3 a section on the line 3—3 of Fig. 1.

According to my invention, a sliding sleeve member 1 is applied to the steering column 2 of the motor vehicle and is movable longitudinally on the steering column by means of an annular hand hold 3 which is positioned near the usual steering wheel rim 4, so that the same may be readily manipulated while the hands of the operator grasp the steering wheel rim.

In order to facilitate the application of the sliding sleeve member to the steering column, the sleeve is preferably made of longitudinal half sections each of which is soldered or otherwise secured to a bushing half section 5 having an annular rib 6 which engages in a corresponding recess formed in the hub portion of the half sections of the hand hold portion 3. The half sections are applied to the steering column 2 and clamped together by means of bolts 7 extending through the arms 8.

Secured at the lower end of each sleeve half section is a flange half section 9 and said flange half sections are grooved to receive a split spring ring 10 which is snapped in position to hold the lower ends of the half sections in position after the parts have been applied to the steering column. A soft rubber ring 11 may be mounted in the flange half sections 9 to serve as a cushion or bumper.

Preferably mounted on the instrument board 12 of the motor vehicle is a bracket 13 in which a rocker arm 14 is pivotally mounted. One end of the arm 14 bears against the flange half sections 9 and the other end engages the end of a push rod 15 which passes through an opening in the instrument board 12.

At any convenient location, in line with the push rod 15, a valve casing 16 may be mounted, said casing having a valve chamber 17 containing a slide valve 18 adapted to be operated in one direction by the push rod 15 and having a spring 19 tending to shift the valve in the opposite direction.

A brake cylinder 20, for applying the brakes on the vehicle, is provided with a pipe 21 leading to the seat of slide valve 18 and pipe 22, leading to the seat of said slide valve, is connected to a reservoir 23, adapted to be charged with fluid under pressure.

In operation, when the hand hold 3 is released, as shown in the drawing, the spring 19 maintains the slide valve 18 in release position, in which the brake cylinder 20 is connected through cavity 24 in slide valve 18 with exhaust port 25.

When it is desired to apply the brakes, the operator, while retaining his hold on the steering wheel 4, grasps the hand hold 3 and draws same toward the steering wheel. The push rod 15 is then operated, through the rocker arm 14, to shift the slide valve 18, so that the reservoir 23 is connected, through the cavity 24 in slide valve 18 with the brake cylinder 20. Fluid under pressure is then supplied from the reservoir to the brake cylinder to effect an application of the brakes. When the brakes have been applied with the desired force, the hand hold 3 is let off sufficiently to permit the slide valve 18 to be shifted by the spring 19, so as to move the valve to lap position. If it is desired to release the brakes, the hand hold 3 is released, permitting the spring 19 to shift the slide valve 18 to release position, in which the brake cylinder is connected to the exhaust portion 25.

It will now be seen that by manipulating the hand hold 3 while grasping the steering wheel 4, in whatever position the hands may be, the brakes may be applied and released as desired.

Having now described my invention, what

I claim as new and desire to secure by Letters Patent, is:—

1. In a motor vehicle brake, the combination with a steering column and a steering wheel, of a valve for controlling the fluid pressure brakes, a push rod for operating said valve, a sleeve mounted to slide on said steering column, an annular flange at one end of said sleeve, a pivoted lever having one end engaging said flange and the other end engaging said push rod, and an annular hand hold at the other end of said sleeve for operating said sleeve.

2. In an automotive brake equipment, the combination with a brake chamber and a valve for controlling the supply and release of fluid under pressure to and from said brake chamber, of a motor vehicle steering post, a steering wheel, a sleeve slidably mounted on said post and having an annular flange at one end, a push rod engaging said valve, a pivotally mounted lever having one end in engagement with said valve flange and the other end in engagement with said valve, and a member carried by the other end of said sleeve and arranged near the steering wheel and operable by a hand grasping the steering wheel for actuating said sleeve and valve to supply fluid to said brake chamber, the release of said member being adapted to permit movement of said valve to effect the release of fluid from said brake chamber.

In testimony whereof I have hereunto set my hand.

CARLTON D. STEWART.